United States Patent [19]

Haas et al.

[11] 4,102,589

[45] Jul. 25, 1978

[54] METHOD OF AND MEANS FOR SAFELY RELEASABLY TENSIONING STRUCTURAL PARTS SUCH AS CLAMPING MEMBERS

[75] Inventors: Helmut Haas; Klaus-Peter Baulig, both of Cologne, Germany

[73] Assignee: Klöckner-Humboldt-Deutz Aktiengesellschaft, Germany

[21] Appl. No.: 688,717

[22] Filed: May 21, 1976

[30] Foreign Application Priority Data

May 22, 1975 [DE] Fed. Rep. of Germany ....... 2522610

[51] Int. Cl.² ................................................ B25G 3/20
[52] U.S. Cl. .................................. 403/373; 74/579 E; 308/71
[58] Field of Search ......................... 308/71; 74/579 E; 403/373

[56] References Cited

U.S. PATENT DOCUMENTS

| 1,368,646 | 2/1921 | Morrow ....................... 74/579 E UX |
| 1,924,326 | 8/1933 | MacFadden ................... 74/579 E X |
| 1,948,176 | 2/1934 | Hopkins et al. ............... 74/579 E X |
| 2,042,783 | 6/1936 | Hall ................................. 308/71 UX |
| 2,280,662 | 4/1942 | Pawsat ............................. 403/373 X |

*Primary Examiner*—Wayne L. Shedd
*Attorney, Agent, or Firm*—Hill, Gross, Simpson, Van Santen, Steadman, Chiara & Simpson

[57] ABSTRACT

A method of and means for safely releasably tensioning structural parts such as clamping members for mounting tube or ball mills and comprising drawing the clamping members toward one another by means of a tie rod bolt sufficiently to effect necessary clamping grip on the mill tube, and then disposing a spacer in clamped relation between the clamping members and further tightening the bolt to prevent loosening of the bolt while protecting the tube mill against excessive clamping stress.

7 Claims, 2 Drawing Figures

METHOD OF AND MEANS FOR SAFELY RELEASABLY TENSIONING STRUCTURAL PARTS SUCH AS CLAMPING MEMBERS

This invention relates to a method of and means for safely releasably tensioning clamping members such as in the mounting of tube mills in gyratory carriages.

In securing the tubular casings of tube mills of either the ball mill or rod mill type in gyratory carriages, it has been customary to clamp the same in place on the gyratory mounts of the carriages by means of clips engaging about a portion of the periphery of the tubes and fastened by means of tie rod bolts. However one of the problems that has been encountered is that the fastening nuts of the generally necked-down tie rod bolts may be tightened only to the extent that the clamping pressure on the tube mill tube is not undesirably deformed. Due to the vibrations to which the gyratory carriage is subjected in this type of mill assembly, the securing nuts on the bolts are often not sufficiently tight to stress the bolts adequately to avoid loosening due to the constant vibratory action, which can become particularly severe due to impact of the tube mill contents such, for example, from agitation of the grinding bodies such as rods or balls impacting the grinding tube wall in operation. Therefore great difficulty has heretofore been experienced in maintaining the tube mill reliably clamped against loosening in time.

It is therefore an important object of the present invention to provide a new and improved method of and means for effectively clamping tubular ball mills positively against loosening from the effects of the constant vibrations in operation.

According to features of the invention the problem of attaining thorough and reliable retention of tubular ball mills is solved by first tightening the tie rod bolts up to the permissable degree of compression upon the tubular mill casing, and then further tightening the securing bolts while maintaining the clamping pressure against the tube casing substantially constant as attained in the initial or prestress mill-securing tightening of the bolts.

More particularly, the initial or prestress tightening of the bolts is sufficient to clamp the tubular mill casing in each instance sufficiently securely between the gyratory carriage and the clamping clips or yokes to retain the casing against displacement from the tight clamping retention even under the heaviest shock impulses to which the assembly may be subjected in operation, but avoiding a clamping force of such magnitude as would undesirably deform the grinding tube or casing. Then with a safety spacer device engaged across the narrow gaps still present between the secured ends of the yoke in each instance and the gyratory carriage body, the bolts are further tightened and tensioned substantially beyond the prestressed condition where the mill casing is thoroughly secured. The safety spacers prevent further clamping constriction of the yoke toward the carriage body, but the bolts are free to be additionally stressed so that the retaining nuts will not loosen during operation of the mill.

In a preferred embodiment, the clamping pressure or compression limiting spacers are adjustable so that although optimum safe compression may be applied to retain the ball mill casing in place in the carriage, attained in the initial tightening and prestressing of the bolts, the spacers then can be adjusted to restrain the clamping yokes against applying any substantial additional clamping pressure against the tube mill casing even though the bolts may be substantially further tightened to assure thorough retention against loosening in operation of the assembly.

The invention and its further advantages will be explained in greater detail in conjunction with description of the embodiment shown diagrammatically by way of example in the accompanying drawings, wherein.

Figure 1:
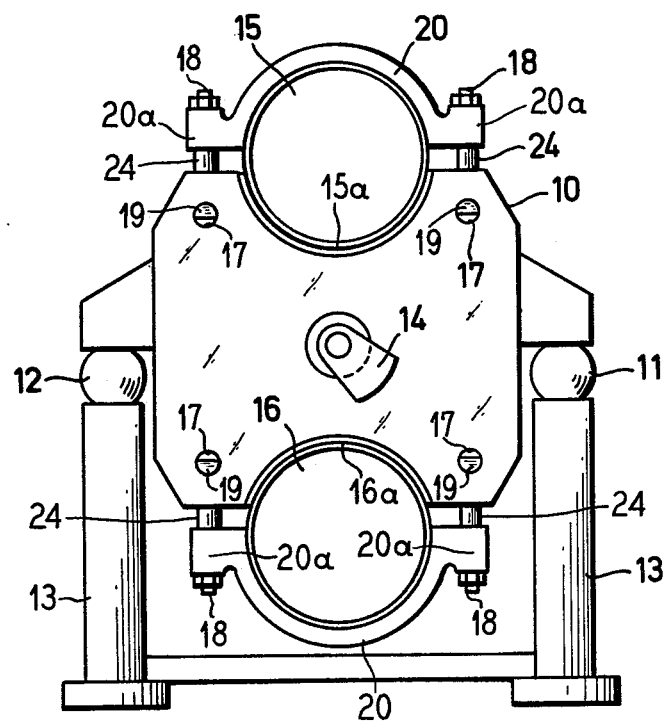
FIG. 1 is a front elevational view of a tube mill embodying the invention.

In a tube mill installation or assembly as shown in FIG. 1 a gyratory carriage may comprise a plurality of cooperatively related arm or supporting members 10, of which only the member 10 at the front end of the mill assembly is shown in FIG. 1. The member 10 is supported by means of resilient, preferably rubber springs 11 and 12 on a frame 13 in such a manner that constant vibratory gyratory grinding motion can be imparted in use to the carriage by means of a central eccentric drive 14. In the illustrated example a dual mill arrangement is depicted wherein on the upper side of the carriage there is mounted a grinding tube 15 and on the lower side of the carriage is mounted a lower grinding tube 16. Both of the tubes 15 and 16 are secured in place in respective complementary saddles 15a and 16a providing clamping portions in the carriage members 10 by means of complementary clamping portions of clamping clips or yokes 20 complementary to the perimeter of the respective grinding tubes 15 but sufficiently less than half the circumference so that drawup portions comprising attachment arms 20a at the opposite ends of the yokes 20 will remain in spaced relation to confronting drawup portions of the carriage members 10 in each instance.

Figure 2:
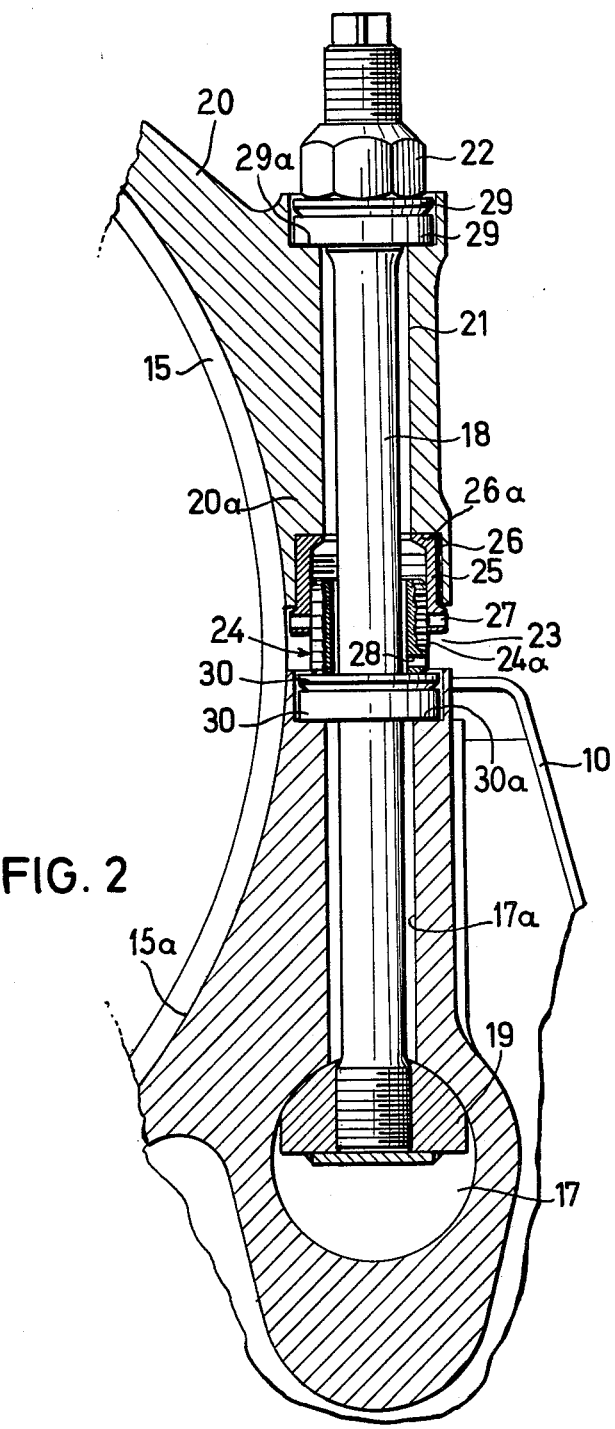
FIG. 2 is a fragmentary enlarged sectional elevational view showing one of the new and improved fastening devices embodying features of the invention and of which several are employed in securing tubular mills in an installation as shown in FIG. 1.

As best visualized in FIG. 2, according to the method of the present invention each of the necked-down tie rod bolts 18 is anchored at one end by means of a preferably ball head or nut 19 within a complementary eyelet 17 in the member 10, with the shank of the bolt extending freely through a bore 17a in the member 10 and an aligned bore 21 in the yoke arm 20a. On the end of the bolt 18 which projects outwardly beyond the bore 21, a fastening and bolt tensioning nut 22 is screwed onto the bolt and tightened as by means of a suitable driving machine which screws the nut 22 down against washers 29 seating on a shoulder 29a about the outer end of the bore 21. The nut 22 is secured with sufficient force in a first stage to draw up and tension the bolt 18 to a sufficient prestress level to clamp the casing of the associated mill tube firmly and positively in place between its associated saddle and the clamping yoke 20. As a result of the prestressing clamping tightening of the bolt 18 a narrow gap 23 between the adjacent, confronting portions of the member 10 and the yoke arm 20a narrows, but nevertheless persists.

After pretensioning or clamping prestressing of the bolt 18, a safety spacer device 24 introduced into the gap 23, according to the present invention, holds the confronting portions of the member 10 and the yoke arm 20a against further approach toward one another and the bolt 18 is further tightened in a second stage to a substantial degree in addition to the prestressing or tensioning to apply additional tension to an extent which will substantially preclude loosening of the nut 22, or for that matter the nut 19 where such a nut is used instead of a head on the bolt, even against strong impact pulses or vibrations due to the action of grinding bodies present in the tube mill during gyratory operation of the mill assembly.

In order to facilitate adaptation of the safety spacer device 24 to the width of the gap 23 after full pretensioning of the bolt 18, and thus substantially full permissable clamping pressure on the tube mill casing, the spacer device 24 is desirably constructed to be readily adjusted to accommodate the gap width which due to various tolerance and stress factors may vary from place to place in the assembly after full prestressing has been accomplished. Accordingly, the spacer device 24 comprises relatively adjustable elements, in a preferred form comprising an externally threaded sleeve 24a loosely mounted about the shank of the bolt 18, and a complementary internally threaded bushing 25 which is threadedly engaged on and about the sleeve 24a. One of the spacer elements, herein the sleeve 24a thrusts against the member 10, and the other of the spacer elements, herein the bushing 25 is adapted to thrust against the arm 20a and for this purpose is engaged in a complementary centering guide recess socket 26 in the arm 20a. Before the initial tightening down or pretensioning of the bolt 18, the sleeve 24a and the bushing 25 are preferably in a relatively screwed together relationship wherein the spacer device 24 will not interfere with proper drawing up of the yoke 20 relative to member 10 for positive clamping of the tubular casing of the associated grinding mill. Upon completion of the pretensioning of the bolt 18, the sleeve 24a and the bushing 25 are relatively threadedly rotated into thrusting engagement with respectively the member 10 and the arm 20a. At this point, the bushing 25 is in thrusting engagement against a confronting shoulder 26a at the bottom of the recessed socket 26, and the sleeve 24a thrusts against a shoulder on the member 10 provided conveniently by means of thrust shoulder disks or washers 30 bearing against a thrust shoulder 30a on the member 10 about the adjacent end of the bore 17a. In order to facilitate the relative threaded adjustment of the spacer elements, the bushing 25 is desirably provided with radial holes or bores 27 and the sleeve 24a is provided with similar openings or radial bores 28 to receive actuating torque pins or similar tools for effecting relative adjustment turning of the spacer elements. After the spacer elements 24a and 25 have been driven into rigid thrusting engagement with the member 10 and the arm 20a, final drawing up or tensioning of the bolt 18 can be effected to the degree desirable for positively frictionally locking the nut 22 and by the same token the nut 19 against loosening due to vibrations in operation. Nevertheless, the associated mill tube 15 or 16, as the case may be, will not be overstressed because of the desirable rigid intervention of the spacer 24 in each instance.

As a result of the method and means according to the present invention, all danger that the grinding tubes of the apparatus may loosen during operation is thoroughly overcome.

Although the invention has been described as especially suitable for alleviating a serious problem in respect to tube mills, it will be understood that the invention may be advantageously employed in other practical applications where releasable clamping is the preferred mode of securing parts together.

We claim as our invention:

1. In combination with clamping structures having complementary clamping portions for releasably clamping a member which is subject to constant vibrations in use, said clamping structures having spaced drawup portions:

a securing and tensioning bolt extending in securing relation between said spaced drawup portions and adapted to be drawn up to effect an initial first stage drawing of said drawup portions toward one another to effect pressing of the clamping portions of said structures into retaining clamping engagement with said member to a sufficient prestress level to clamp said member firmly and positively in place but leaving said drawup portions in limited spaced relation defining a gap between the drawup portions;

said drawup portions having respective shoulders facing toward one another in surrounding relation about said bolt at opposite sides of said gap;

a two-part relatively adjustable safety spacer device extending across said gap and surrounding said bolt between said shoulders without interfering with approach of said shoulders during said initial first stage drawing up of the drawup portions;

said two parts of the safety spacer device being adjustable relative to one another after said initial first stage drawup to engage thrustingly in positive rigid spacing relation against said shoulders to hold the spaced first stage drawn up drawup portions against further approach toward one another;

and said bolt being adapted to be drawn up into a second stage tensioned condition of the bolt on the drawup portions to strongly resist loosening of the bolt due to vibrations in the assembly, said adjusted safety spacer device rigidly maintaining said gap between the drawup portions and restraining the drawup portions against increasing clamping pressure of said clamping portions against said member beyond said initial first stage drawing up pressure exerted by action of said bolt on said drawup portions.

2. A combination according to claim 1, wherein said safety spacer device parts comprise threadedly connected relatively extensible and retractable elements, and means for relatively threadedly manipulating said elements to effect threaded extension of the elements from retracted relation in said gap into extended relation equal to the width of the gap into thrusting relation to said shoulders whereby to prevent movement of the drawup portions toward one another beyond the first stage drawup tensioning of the bolt but permitting the bolt to be drawn up into the second stage tensioning of the bolt.

3. A combination according to claim 2, wherein one of said shoulders is a thrust washer shouldering against one of said drawup portions and toward which one of said elements thrusts, and the other of said drawup portions having a centering socket within which the other of said elements is received and providing the shoulder against which said other element thrusts.

4. A combination according to claim 1, wherein said safety spacer device parts comprise threadedly interengaged elements which are relatively axially adjustable, and means for threadedly adjusting the elements for effecting engagement at opposite ends with said spaced apart shoulders.

5. A combination according to claim 4, wherein one of said elements comprises an externally threaded sleeve concentric about the bolt, and the other of said elements comprises an internally threaded bushing thimble concentric about the bolt.

6. A method of safely releasably clamping between complementary clamping portions of clamping structures a member which is subject to constant vibrations in use and which must be held firmly by and between the clamping portions but must not be overstressed by clamping pressure, comprising:

applying a bolt to and between spaced drawup portions of said structures;

effecting an initial first stage drawing up of said bolt and thereby drawing said drawup portions toward one another and effecting pressing of the clamping portions of said member to a sufficient prestress level to clamp the clamped member firmly and positively in place, but leaving said drawup portions in limited spaced relationship defining a gap between the drawup portions;

providing a two-part longitudinally adjustable safety spacer device across said gap and in surrounding relation to said bolt between respective spaced shoulders on said draw portions facing toward one another in surrounding relation about said bolt at opposite sides of said gap;

during said initial first stage drawing up maintaining said spacer device substantially free from interfering with approach of said shoulders toward one another;

after completion of said initial first stage drawing up of said bolt adjusting said spacer device parts relative to one another and effecting thrusting engagement to said parts respectively in rigid space retaining relation against said shoulders;

and finally effecting a second stage drawing up of said bolt on the drawup portions into a tensioned condition of the bolt which will strongly resist loosening of the bolt due to vibrations in the assembly, and by said safety spacer device parts thrusting against said shoulders rigidly maintaining said gap between the drawup portions and restraining the drawup portions against increasing clamping pressure of said clamping portions against said member beyond said initial first stage drawing up pressure.

7. A method according to claim 6, wherein said safety spacer device parts comprise threadedly interengaged elements which are relatively axially adjustable, threadedly adjusting said elements to be shorter than the space between said shoulders while effecting said first stage drawing up, then adjusting said elements threadedly to thrust rigidly against said shoulders, and thereby holding said drawup portions against further bolt effected drawup movement toward one another, and then effecting said second stage drawing up of said bolt.

* * * * *